(12) United States Patent
Jennings et al.

(10) Patent No.: US 7,837,357 B2
(45) Date of Patent: Nov. 23, 2010

(54) COMBINED ILLUMINATION AND IMAGING SYSTEM

(75) Inventors: Dean C. Jennings, Beverly, MA (US); Timothy N. Thomas, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 1181 days.

(21) Appl. No.: 11/480,133

(22) Filed: Jun. 30, 2006

(65) Prior Publication Data

US 2008/0002253 A1   Jan. 3, 2008

(51) Int. Cl.
*F21S 8/00* (2006.01)
*G02B 21/06* (2006.01)
*F21V 9/14* (2006.01)

(52) U.S. Cl. .................. 362/268; 362/19; 362/29; 362/293; 359/385

(58) Field of Classification Search ............... 362/19, 362/29, 268, 293; 359/385
See application file for complete search history.

(56) References Cited

U.S. PATENT DOCUMENTS

| | | | | |
|---|---|---|---|---|
| 6,206,532 B1 * | 3/2001 | Hawes | ............... | 362/19 |
| 6,788,388 B2 * | 9/2004 | Smith | ............... | 355/67 |
| 7,423,731 B2 * | 9/2008 | Tanitsu et al. | ............... | 355/71 |
| 2004/0196644 A1 * | 10/2004 | Kim et al. | ............... | 362/19 |

* cited by examiner

*Primary Examiner*—Stephen F Husar
*Assistant Examiner*—James W Cranson
(74) *Attorney, Agent, or Firm*—Townsend and Townsend and Crew, LLP

(57) ABSTRACT

An illumination system has a light source, an optical train, and a wavelength beam splitter. The optical train focuses light from the light source into a defined geometrical pattern on a surface. The wavelength beam splitter transmits light of a first wavelength and redirects light of a second wavelength. One of these wavelengths is included by the light from the light source, while the other is an emission wavelength generated by thermal excitation of the surface by the focused geometrical pattern.

26 Claims, 8 Drawing Sheets

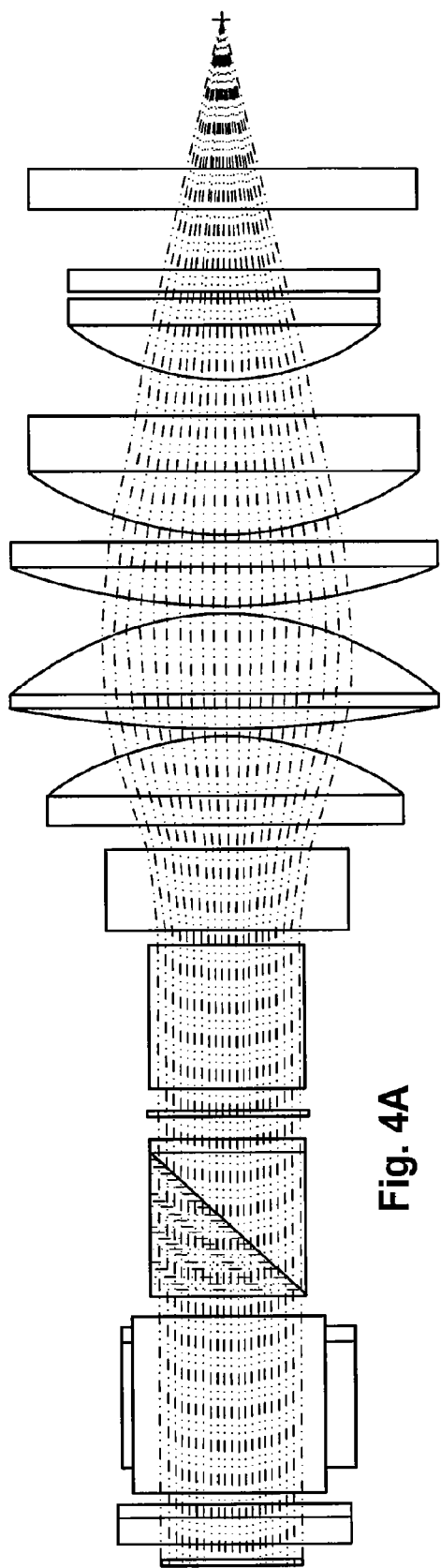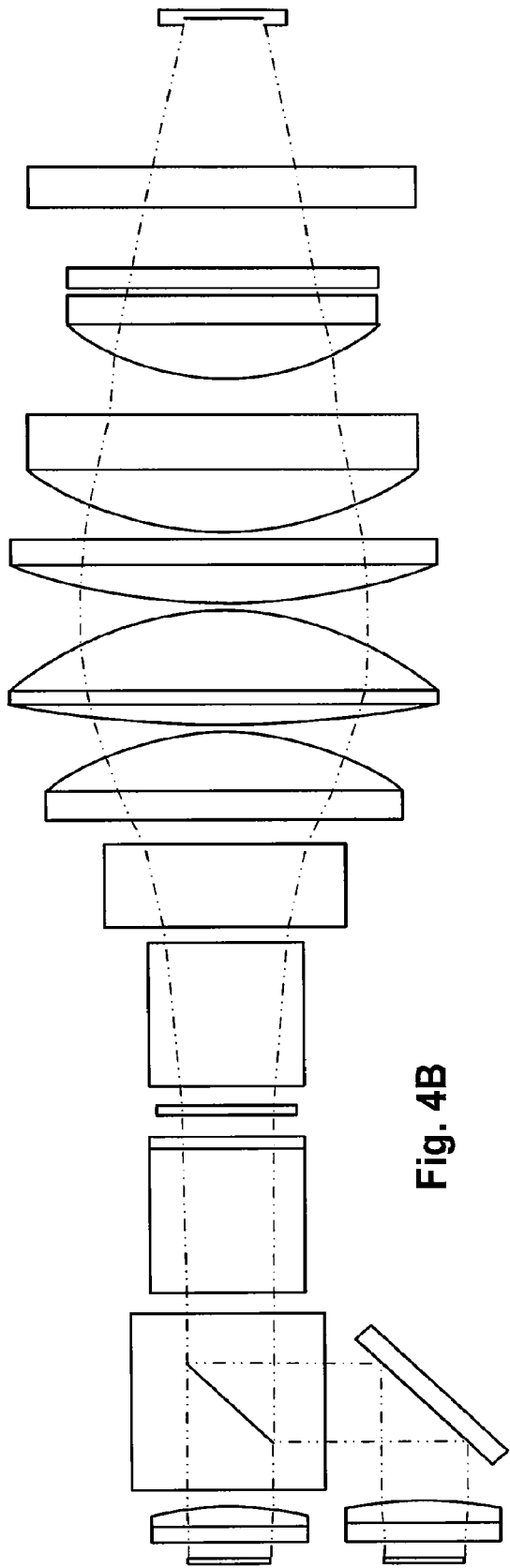
Fig. 4A
Fig. 4B

COMBINED ILLUMINATION AND IMAGING SYSTEM

BACKGROUND OF THE INVENTION

This application relates generally to a combined illumination and imaging system. More specifically, this application relates to an illumination and imaging system configured for use with a thermal substrate processing apparatus.

There are numerous examples of applications in which a substrate may be processed thermally, including thermal annealing processes and chemical-vapor-deposition processes, among others. A general structure of an apparatus that may be used for such thermal processes is illustrated schematically in FIG. 1A. The apparatus comprises an illumination system 104, a stage 128 adapted to receive a substrate 124, and a translation mechanism 132. The illumination system comprises 104 comprises an electromagnetic source 108 that produces illumination that is shaped by an optical arrangement 116 to generate a narrow elongated beam 120 as a line of radiation incident on the substrate 124.

The stage 128 may comprise a chuck or other mechanism for securely holding the substrate 124 during processing. For instance, a frictional, gravitational, mechanical, and/or electrical system may be provided for grasping the substrate 124. The translation mechanism 132 is configured to translate the stage 128 and the beam 120 relative to each other, through movement of the stage 128, movement of the illumination system 104, or movement of both. Any suitable translation mechanism may be used, including a conveyor system, rank-and-pinion system, or the like. The translation mechanism 132 is operated by a controller 136 to define the scan speed of the line of radiation relative to the stage 128.

A more detailed description of specific structures that may be used in implementing the thermal processing apparatus of FIG. 1A and of various alternative and equivalent variations to such a structure, is provided in published PCT application WO 03/089,184, the entire disclosure of which is incorporated herein by reference for all purposes.

FIG. 1B provides a top view of the substrate 124 overlying the stage 128. The line of radiation 140 provided by the narrow elongated beam 120 may extend across the entire diameter of the substrate 124. The relative geometry of the illumination system 104 and the translation mechanism 132 are such that the line of radiation 140 traverses the substrate 124 in a direction perpendicular to its length, i.e. the line 140 remains parallel to a fixed chord 144 of the substrate 124.

There are numerous considerations that may affect the effectiveness of such a system. This application describes embodiments of structures that may be used for the illumination system in such a thermal processing apparatus.

BRIEF SUMMARY OF THE INVENTION

Embodiments of the invention thus provide methods and systems of illuminating a surface that may find application in thermal processing apparatus. In a first set of embodiments, an illumination system is provided for illuminating a surface. The illumination system comprises a light source, an optical train, and a wavelength beam splitter. The optical train is disposed along an optical path between the light source and the surface. The optical train has elements configured to focus light from the light source into a defined geometrical pattern on the surface. The wavelength beam splitter is disposed in the optical path. The wavelength beam splitter is adapted to transmit light of a first wavelength and to redirect light of a second wavelength. One of the first and second wavelengths is comprised by the light from the light source. The other of the first and second wavelengths is an emission wavelength generated by thermal excitation of the surface by the focused geometrical pattern and is not comprised by the light from the light source.

In some instances, the illumination system may be a combined illumination and imaging system that further comprises an imaging subsystem disposed to focus light of the second wavelength redirected by the wavelength beam splitter onto a second surface.

The light source may comprise a monochromatic or quasi-monochromatic light source. In one embodiment, the light source comprises a plurality of laser diodes that emit light at the first wavelength. For instance, the first wavelength may be approximately 808 nm and the second wavelength may be greater than 850 nm. At least some of the optical elements may sometimes include an antireflective coating that is antireflective at the first wavelength and at the second wavelength. One antireflective coating comprises a plurality of layers of $Ta_2O_5$ interleaved with a plurality of layers of $SiO_2$.

In some embodiments, the light source comprises a plurality of light sources, with the optical train comprising a spatial interleaver disposed to interleave light generated by a first set of the plurality of light sources with light generated by a second set of the plurality of light sources. Some embodiment comprise an isolation beamsplitter and a polarization-rotation element disposed in the optical path. The isolation beamsplitter is adapted to transmit light of a specified linear polarization and to redirect light not of the specified linear polarization from the optical path. The polarization-rotation element is adapted to change the specified linear polarization of light incident on the polarization-rotation element to a circular polarization. The isolation beamsplitter and the polarization-rotation element are disposed to be encountered by light emanating from the light source and by light reflected from the surface. In one example, the polarization-rotation element comprises a quarter waveplate.

The optical train may comprise a cylinder array and a plurality of spherical lenses having optic axes along the optical path. The optical train may also comprise a first coupling cylinder having an optic axis along the optical path. In some embodiments, the optical train further comprises a second coupling cylinder having an optic axis along the optical path and spaced apart from the first coupling cylinder.

In a second set of embodiments, methods are provided of illuminating a surface. First light comprising a first wavelength is generated with a light source. The first light is focused with an optical train disposed along an optical path between the light source and the surface into a defined geometrical pattern on the surface. Second light comprising a second wavelength is received along the optical path and redirected from the optical path. The second light is generated by thermal emission from the surface in response to focusing the first light on the surface. The second wavelength is not comprised by the light generated with the light source.

In some embodiments, the redirected second light is focused onto an imaging surface to generate an image of the surface. The first light may be monochromatic or quasimonochromatic. In one embodiment, the first wavelength is approximately 808 nm and the second wavelength is greater than 850 nm.

The first light may sometimes be generated by generating a first set of rays with a first set of a plurality of light sources and generating a second set of rays with a second set of the plurality of light sources. The first set of rays is then interleaved with the second set of ray. In some instances, the first light may be focused in a slow-axis direction with focusing the first light in a fast-axis direction.

In certain embodiments, third light is received along a reverse direction of the optical path and corresponds to light reflected from the surface. The third light is redirected from the optical path. In such embodiments, light of a specified linear polarization may be transmitted along the optical path and light not of the specified linear polarization redirected from the optical path. The specified linear polarization of the transmitted light may be changed to a circular polarization before it encounters the surface. The third light then has the circular polarization of the first light. This permits the third light to be redirected from the optical path by changing the circular polarization of the third light to a linear polarization different from the specified linear polarization, and again redirecting light not of the specified linear polarization from the optical path.

In a third set of embodiment, an apparatus is provided for thermally processing a substrate. The apparatus comprises a stage, a combined illumination and imaging system, and a translation mechanism. The stage is disposed to support the substrate. The combined illumination and imaging system is adapted to illuminate the substrate with a line of electromagnetic radiation extending partially across a surface of the substrate. It is also adapted to provide an image of a portion of the substrate from an emission from the portion of the substrate generated by thermal excitation of the portion of the surface by the line of electromagnetic radiation. The translation mechanism is adapted to translate the stage and the line of electromagnetic radiation relative to each other.

In various embodiments, the combined illumination and imaging system may comprise structures like those described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components

FIG. 4A provides a fast-axis view of the propagation of light in the illumination system of FIG. 2;

FIG. 4B provides a side-axis view of the propagation of light in the illumination system of FIG. 2;

DETAILED DESCRIPTION OF THE INVENTION

Figure 1A:
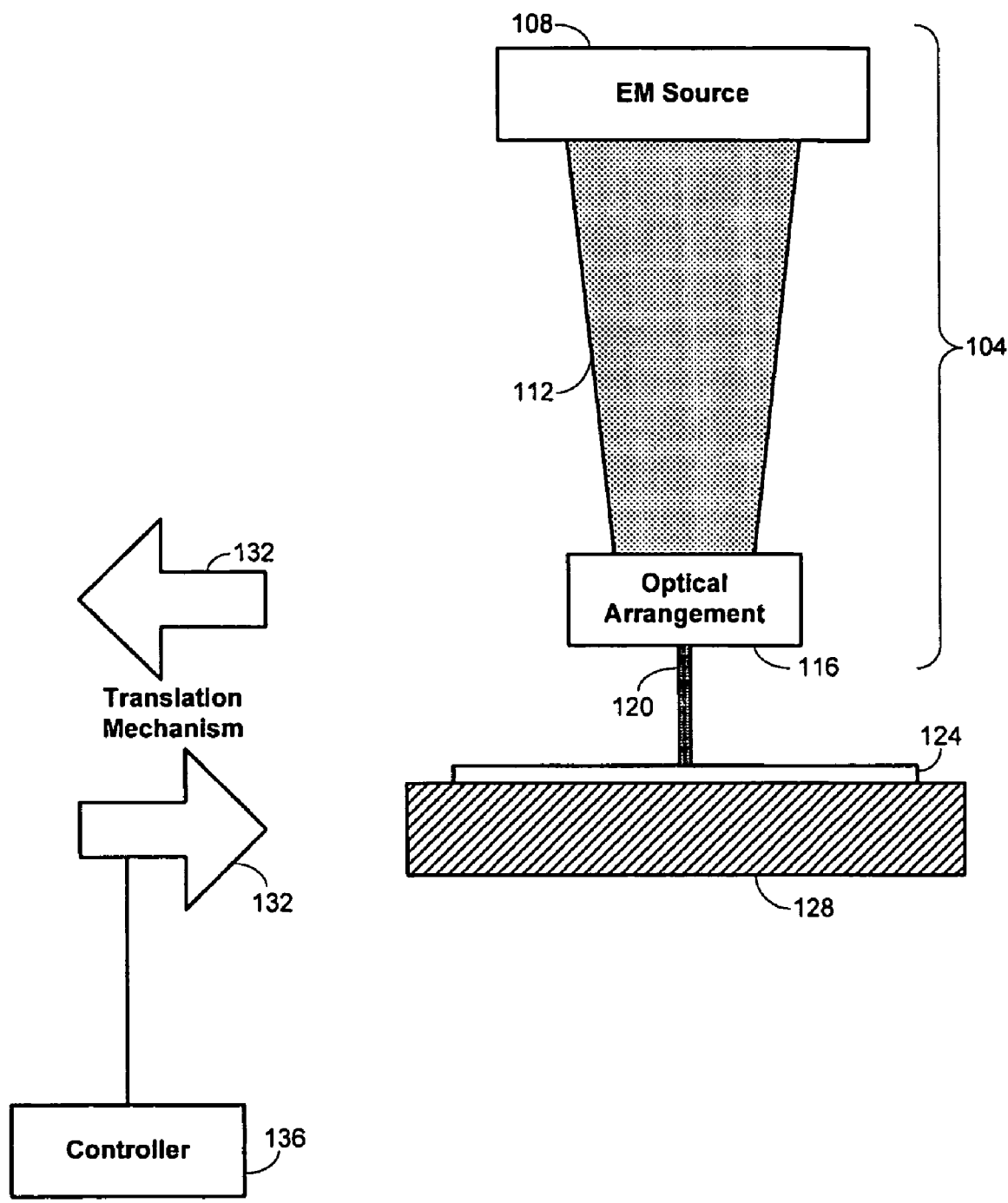
FIG. 1A shows a side view of an apparatus for thermal processing of a substrate.

Embodiments of the invention provide an illumination system. While the illumination systems described herein were developed for use with a thermal processing system like that illustrated in FIG. 1A, they may find utility in other applications. The description of uses in thermal processing applications is thus intended merely to be exemplary and is not intended to limit the scope of the invention. In certain embodiments, the illumination system comprises an imaging system to provide a combined illumination and imaging system, although this is not required in all embodiments.

Figure 2:
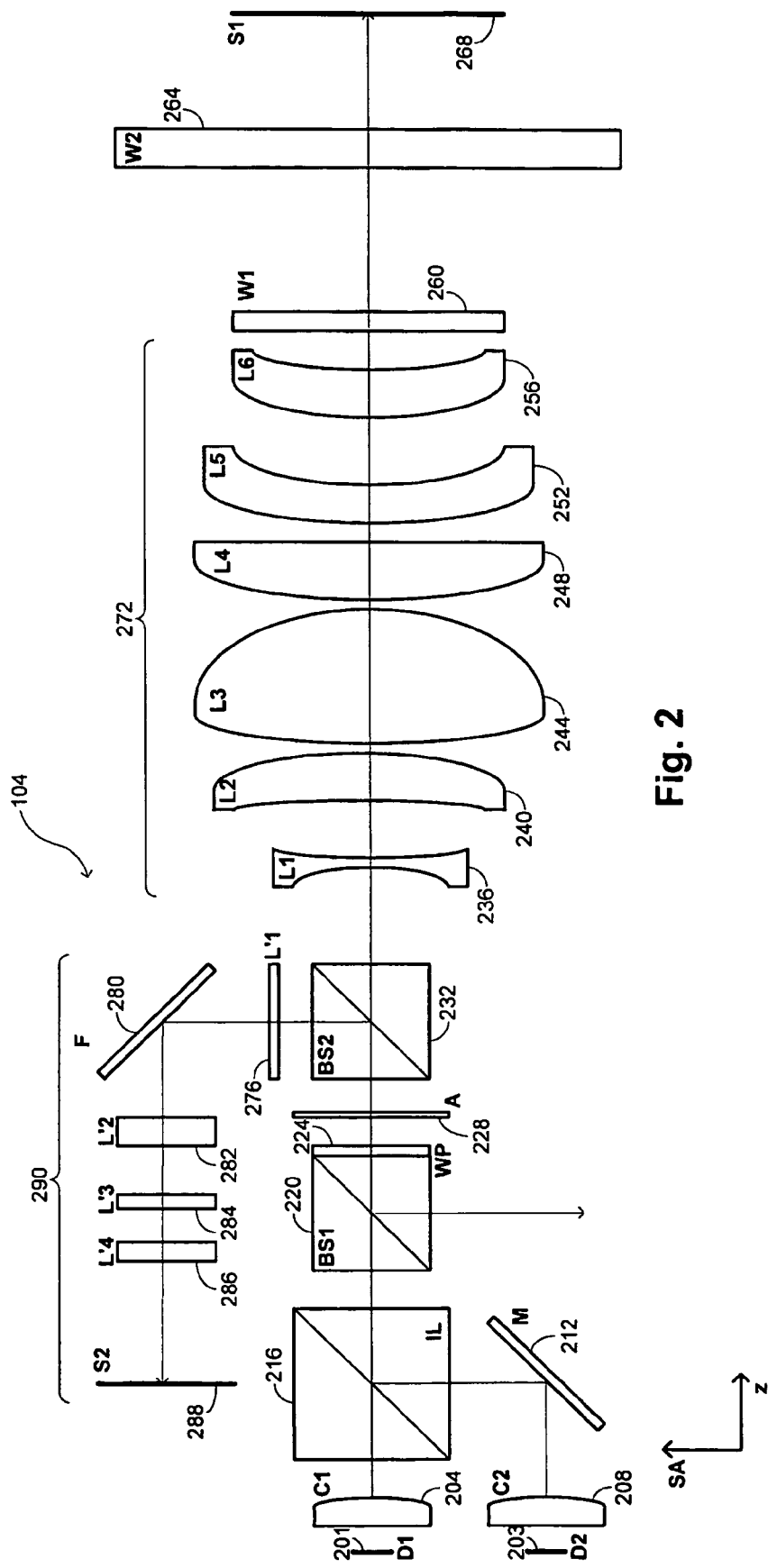
FIG. 2 shows an arrangement of optical elements that forms an illumination system that may be used with the apparatus of FIG. 1A in one embodiment.

An overview of the optical structure of the illumination system in an embodiment is provided with the schematic diagram of FIG. 2. In this drawing, the optical axis from one or more electromagnetic sources to a surface is designated as the z axis. The slow axis ("SA") of the system in this drawing is identified, with the fast axis ("FA") being orthogonal to the page. In certain embodiments, divergences of light through the system along the slow axis are less than 7.5° and are less than 0.2° along the fast axis.

In the illustrated embodiment, light is provided by a plurality of light sources 201 and 203, identified as "D1" and "D2" in the drawing, and directed to a surface 268, identified as "S1" in the drawing. In embodiments where the illumination system is part of a thermal processing system, the surface 268 S1 may comprise the surface of a substrate undergoing processing and disposed within a processing chamber. Light may enter the chamber through a chamber window 264, identified as "W2" in the drawing.

The light sources 201 and 203 may comprise any form of electromagnetic source in different embodiments. In some instances, the light sources 201 and 203 comprise monochromatic or quasimonochromatic sources such as laser diodes ("LDs") or light-emitting devices ("LEDs"). For example, each of the light sources 201 and 203 might itself comprise a plurality of a laser-diode bars. For thermal processing applications, suitable wavelengths for such sources may be between 190 and 950 nm, with a particular application using illumination at 808 nm, but other wavelengths may be used for other types of applications. In some embodiments, the light sources 201 and 203 are capable of providing illumination continuously for a period of time that exceeds 15 seconds.

Respective coupling cylinders 204 and 208, identified in the drawing as "C1" and "C2," are oriented to focus light down in the slow-axis direction. The coupling cylinders 204 and 208 have optical power in only one direction; the focusing that they provide in that direction ensures that most or all of the energy provided by the light sources 201 and 203 is retained in the optical system.

Light from the different light sources 201 and 203 may be interleaved, providing better alignment control. Such interleaving is achieved with a spatial interleaver 216, identified as "IL" in the drawing. Light is directed to the spatial interleaver 216 from each of the light sources 201 and 203. In the illustrated embodiment, light from source 201 is directly incident on the spatial interleaver 216 after passing through coupling cylinder 204, while light from source 203 is directed to the spatial interleaver by a folding element 212, such as a mirror identified as "M" in the drawing. More generally, any combination of light-direction elements may be used to direct the light from the sources 201 and 203 to the spatial interleaver 216.

The principal optical elements in the illumination system 104 that generate that the image of the light onto surface 268 S1 include a cylinder array 228, identified in the drawing as "A," and an array of spherical lenses 272. This combination of optical elements is sometimes referred to in the art as a "flyby homogenizer" and acts to generate multiple images of the light on an image plane and to focus the light into the desired shape on the surface 268 S1. In one embodiment, the multiple images comprise on the order of several tens of images. The cylinder array 228 comprises a micro-optic array of cylindrical lenses or lenslet pairs that overlay their aperture onto surface 268 S1. The radiance produced on surface 268 S1 is the sum of the radiance from each of the component lenses or lenslet pairs, and the variability of the illumination on surface 268 S1 is the average of the variability from the component lenses or lenslet pairs.

Figure 1B:
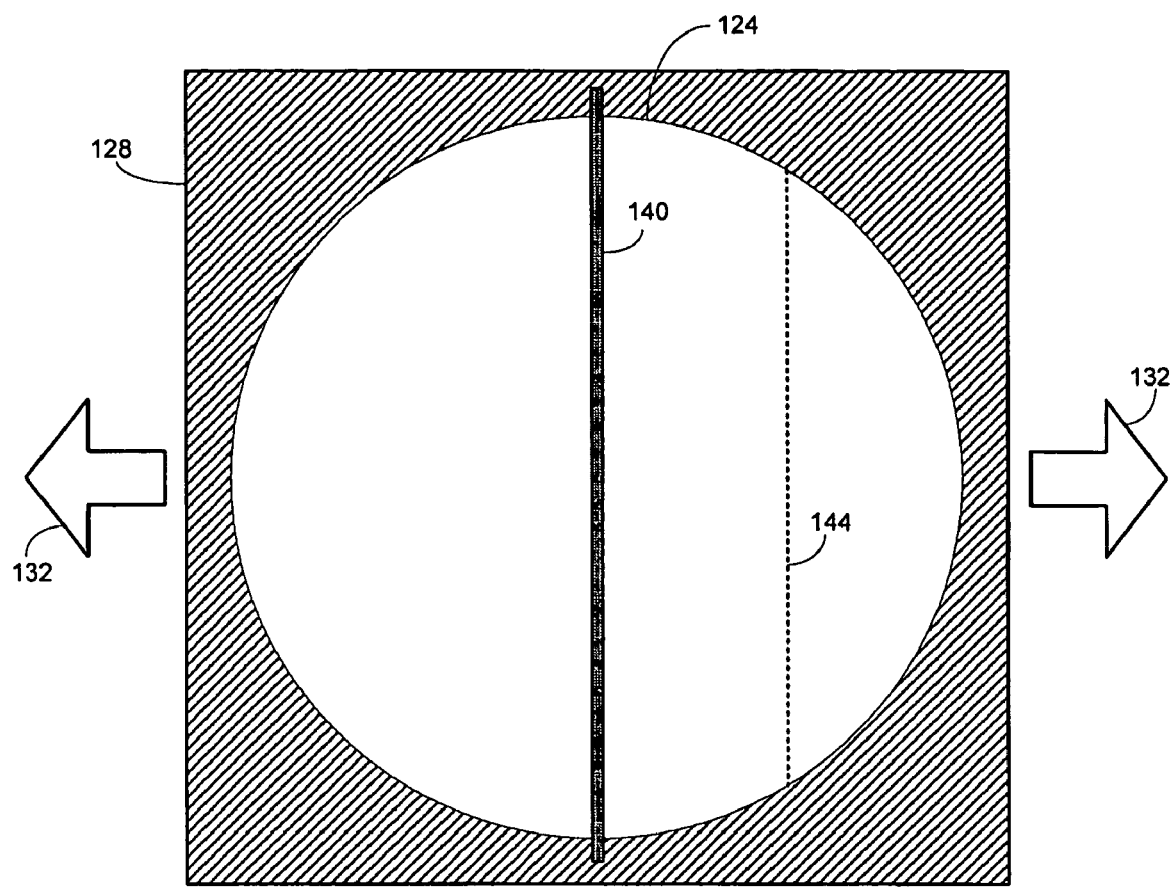
FIG. 1B shows a top view of a substrate being processed with the apparatus of FIG. 1.

In the embodiment illustrated in FIG. 2, the spherical lens array 272 comprises six lenses 236, 240, 244, 248, 252, and 256, identified as "L1"-"L6" in the drawing. The invention is not limited to this particular number of lenses and alternative embodiments may include a different number of lenses. The specific optical characteristics of each of the lenses and the way in which they are combined may define the shape of the overlaid images provided on surface 268 S1. In embodiments where the illumination source is a component of a thermal processing apparatus like that described in connection with FIGS. 1A and 1B, the spherical lens array 272 may have a prescription that provides a narrow elongated beam of light onto surface 268 S1.

The illumination system 104 may comprise one or more beamsplitters in different embodiments to manage the backtransmission of light through the system. For example, the interleaved light is directed to an isolation beamsplitter 220, identified as "BS1" in the drawing. This element acts as a polarizing beamsplitter so that light that passes along the optical axis z has a defined polarization. A waveplate 224, identified in the drawing as "WP," retards the polarization of the transmitted light by a defined amount; for instance, the waveplate 224 may comprise a quarter waveplate so that light that linearly polarized light that passes through the beamsplitter 220 becomes circularly polarized. Alternative polarization-rotation structures may be used, such as in embodiments that use a Faraday rotator.

After passing through the remainder of the illumination system 104, some of this light may be reflected from surface 268 S1 back through the system. During such backtransmission, the second encounter of the light with the waveplate 224 causes the light again to become linearly polarized, but rotated by 90°. Upon its second encounter with the polarizing beamsplitter 220, this reflected light is directed to a light dump and prevented from propagated back to the light sources 201 and 203. Many of the light sources 201 and 203 that may be used are susceptible to damage from bright incident light, so such a configuration acts to protect the light sources 201 and 203 from potential damage.

In embodiments where the illumination system 104 is a component of a thermal processing apparatus, a second beamsplitter 232 may advantageously be included as part of an imaging capability of the illumination system. The second beamsplitter 232 is identified as "BS2" in the drawing and is selective according to wavelength (rather than according to polarization like beamsplitter 220). This selectivity may be exploited by recognizing that an increase in temperature of surface 268 S1, particularly when the surface 268 S1 is comprised by a substrate being processed, may produce thermal radiation that backpropagates through the system. If the second beamsplitter (sometimes referred to herein as a "pyro beamsplitter") is selective at a wavelength different than the wavelength of the illumination provided by the light sources 201 and 203, that thermal radiation may be used to image the surface 268 S1. For example, in an embodiment where the light sources 201 and 203 provide light at 808 nm, the pyro beamsplitter 232 could be configured to redirect light having a wavelength of 950 nm or more.

This redirected light may be used to generate an image of the portion of the surface 268 S1 that is radiating onto a second surface 288, identified as "S2" in the drawing. Imaging is achieved with an imaging subsystem 290 that comprises a plurality of optical elements. In this illustration, the imaging subsystem comprises four lenses, 276, 282, 284, and 286, identified as "L'1"-"L'4" in the drawing, and a folding element 280, identified as "F" in the drawing. The lenses are configured to correct for chromatic aberration resulting from backtransmission through the spherical lens array 272 and the folding element 280 is included to simplify packaging of the illumination system 104.

Packing of the illumination system 104 may also include use of a replaceable window 260, identified in the drawing as "W1," that protects the interior of the illumination system 104. It is noted that in thermal processing applications, window 264 is generally larger than the substrate being processed. This is because access may be needed to all regions of the substrate as part of the processing. Such a constraint need not apply to window 260, particularly when the substrate and/or illumination system 104 are configured for movement so that the light provided by the illumination system 104 may access all parts of the substrate being processed.

Figure 3:
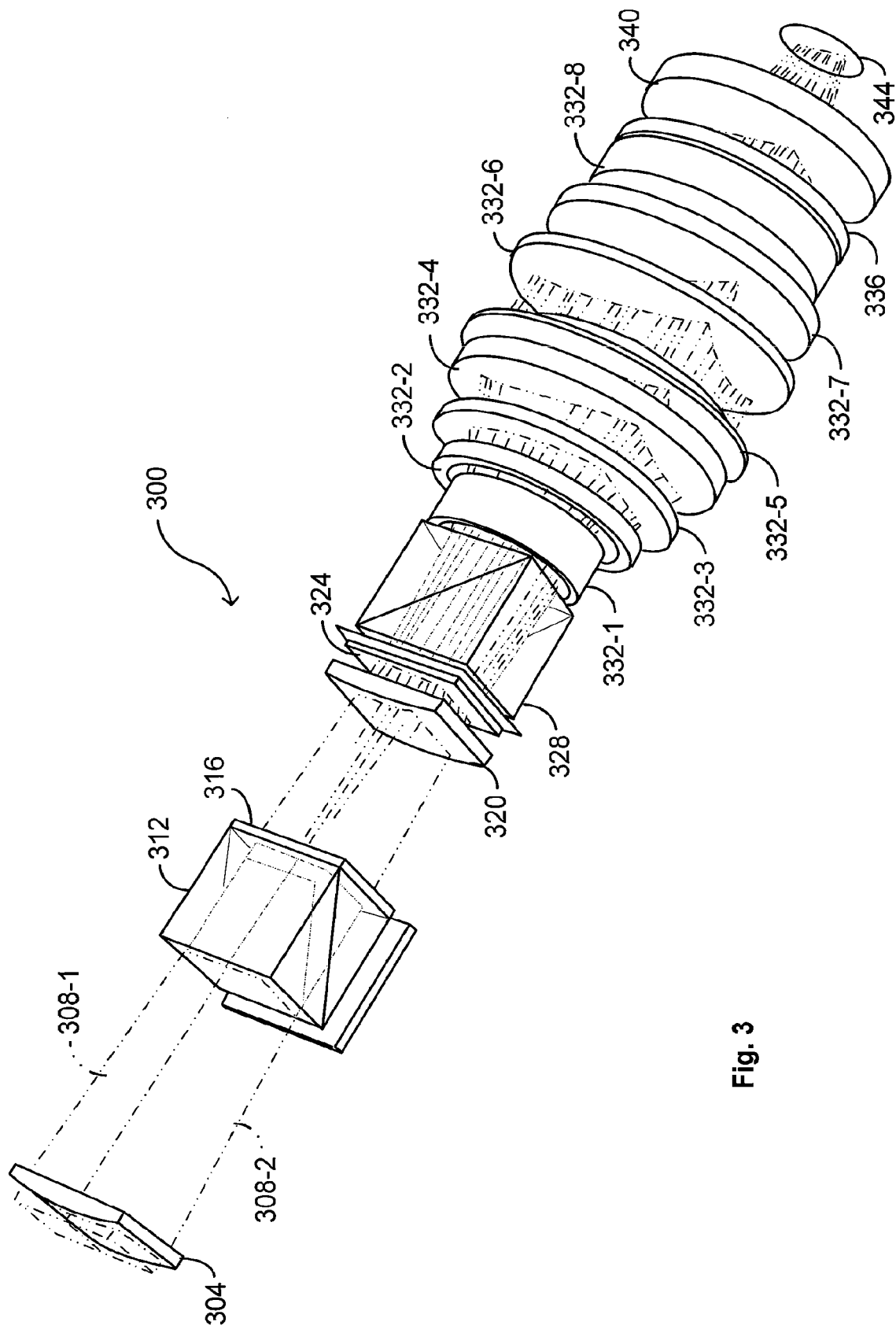
FIG. 3 shows an arrangement of an alternative illumination system that may be used with the apparatus of FIG. 1A in an alternative embodiment.

An alternative embodiment for the illumination system is illustrated in FIG. 3. This embodiment has a generally similar structure as that shown in FIG. 2, although certain variations are highlighted below. In this illustration, light 308-1 from half the light sources is shown in a dark color and light 308-2 from half the light sources is shown in a light color. This illustrates the homogenization of light that is achieved by the assembly. Light incident on the initial coupling cylinder 304, corresponding to C1 and C2 in FIG. 2, the different colors are distinctly separate. After transmission through the assembly to the surface 344, corresponding to S1 in FIG. 2, the different colors are well mixed. This homogenization is achieved with the use of a secondary coupling cylinder 320, whose effect in combination with coupling cylinder 304 and with cylinder array 324 achieves good mixing of the light. The secondary coupling cylinder 320 also mitigates the amount of divergence in the light incident on the cylinder array 324. Effectively, the combination of coupling cylinders 304 and 320 optimize the tradeoff with the divergence of light in the slow-axis direction.

In addition to the use of an additional coupling cylinder 320, the structure of the illumination system 300 of FIG. 3 differs from that of FIG. 2 by omitting an interleaver IL and by including a different number of lenses in the spherical lens array. In this illustration, the spherical-lens array has 8 lenses 332, illustrating that the particular choice of optical structure for the spherical-lens array may vary in different embodiments. Other elements in common with the embodiment of FIG. 2 include the use of an isolation beam splitter 312 and waveplate 316 to manage reflections from the surface 344, and a pyro beamsplitter 328 to image portions of the surface that respond with thermal radiation. Details of the imaging subsystem are not shown in FIG. 3, but are usually included in embodiments that include a pyro beamsplitter 328 to redirect thermal emissions. The replaceable window 336 and chamber window 340 are similar to windows W1 and W2 described in connection with FIG. 2.

To permit a comparison of light mixing in the embodiments of FIGS. 2 and 3, FIGS. 4A and 4B provide fast-axis and side-axis views of light propagating through the illumination system of FIG. 2. As for FIG. 2, this illustration shows half the light in a dark color and half the light in a light color. The two light sources D1 and D2 shown in FIG. 2 respectively provide the dark-color light and the light-color light.

Figure 5:
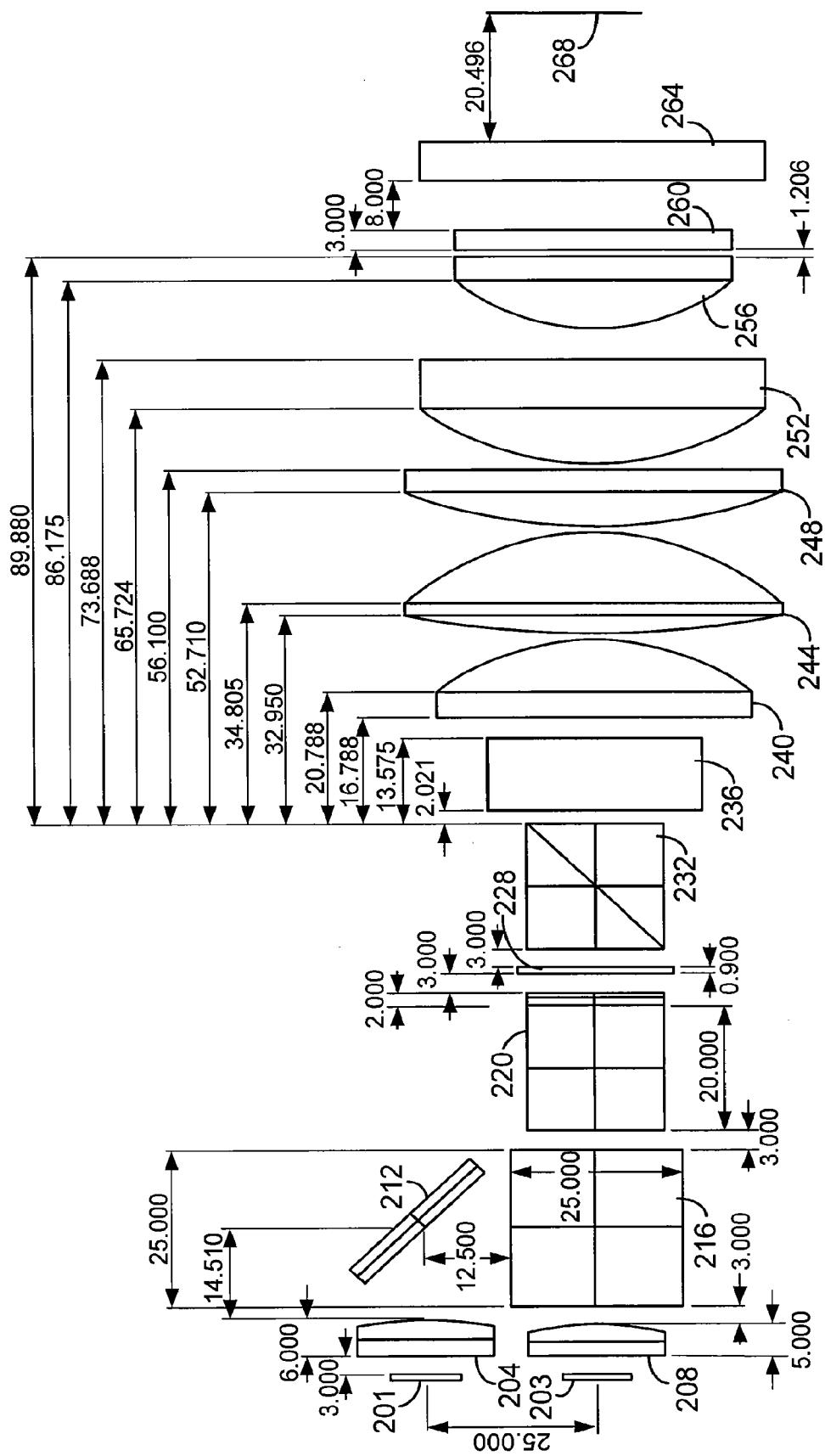
FIG. 5 shows mechanical dimensions for the illumination system of FIG. 2 in a specific embodiment.

A detailed prescription for one embodiment of the invention is provided in Table I, which refers to components of the system using the nomenclature introduced in the discussion of FIG. 2. FIG. 5 provides a detailed specification of mechanical dimensions for the assembly in this illustrative embodiment. In that drawing, all of the dimensions are expressed in mm.

264, and the pyro beamsplitter. Such an antireflective coating could also be applied to other optical elements in the system, although it could be sufficient to apply a coating that is antireflective only around 950 nm to the components of the imaging subsystem 290 and to apply a coating that is antireflective only around 810 nm to the cylinder array 228, the waveplate 224, the isolation beamsplitter 220, the interleaver 216, the mirror 212, and the cylinder arrays 204 and 208.

Figure 6A:
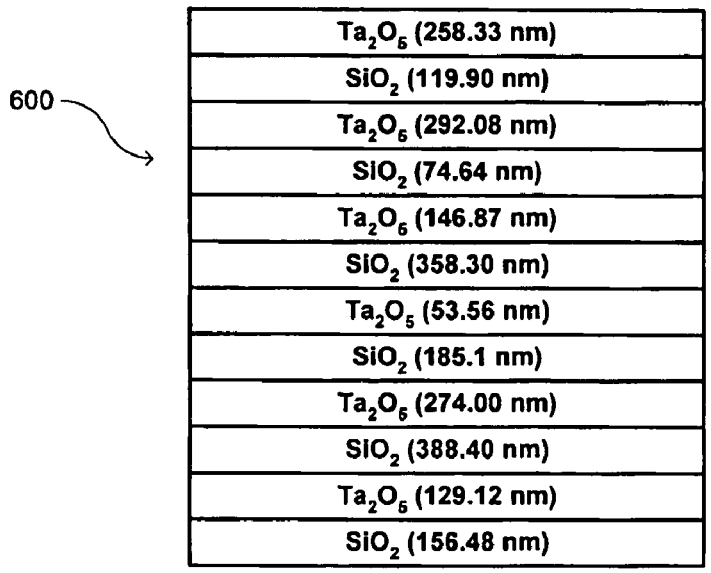
FIG. 6A illustrates a structure of a nonreflective coating that may be comprised by some of the optical elements in the illumination system of FIG. 2 or in the illumination system of FIG. 3.
Figure 6B:
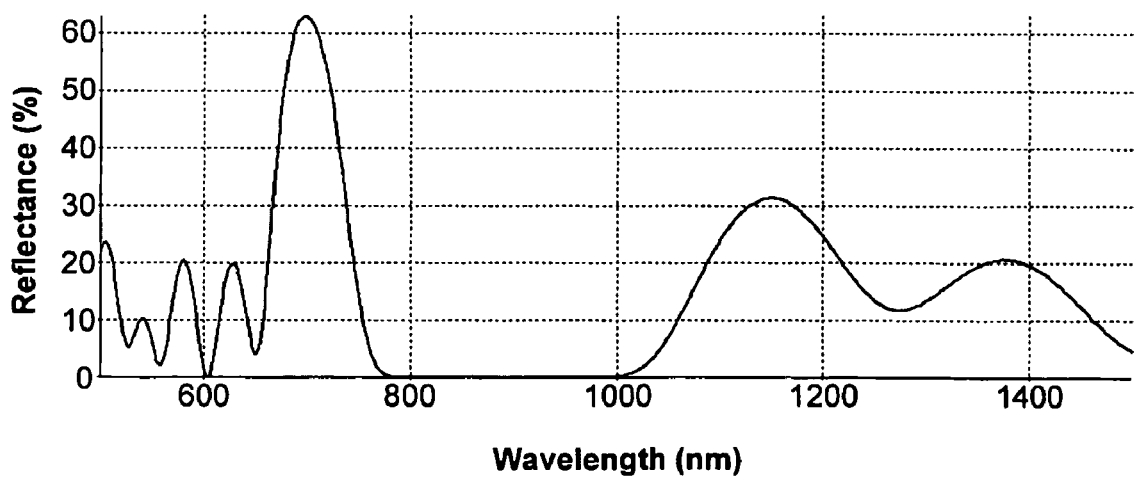
FIG. 6B shows the reflectance properties of the nonreflective coating of FIG. 6A as a function of wavelength.

The inventors have developed a coating that is antireflective from about 800 nm to about 1000 nm. This coating comprises interleaved layers of $Ta_2O_5$ and $SiO_2$. In certain embodiments, the number of interleaved layers is six. A specific configuration is shown in FIG. 6A for a coating 600 in a particularly embodiment, specifying the thicknesses of each of the interleaved layers. FIG. 6B shows a reflectance profile

TABLE I

Prescription for Exemplary Embodiment

| Surface | Radius (mm) | Thickness (mm) | Aperture SA × FA or Diameter (mm) | Material | Edge Thickness (mm) |
|---|---|---|---|---|---|
| D1, D2 | | 3.000 | 13.0 | Air | |
| C1 Surface 1 | | 5.000 | 20 × 30 | Silica | 3.644 |
| C1 Surface 2 | −44.704 | | 20 × 30 | Air | |
| C2 Surface 1 | | 6.000 | 20 × 30 | Silica | 3.692 |
| C2 Surface 2 | −40.2971 | 14.000 | 20 × 30 | Air | |
| M Surface 1 | | 3.000 | 25 × 30 | Silica | 3.000 |
| M Surface 2 | | | 25 × 30 | Air | |
| IL Surface 1 | | 25.000 | 25 × 25 | Silica | 25.000 |
| IL Surface 2 | | 3.000 | 25 × 25 | Air | 3.000 |
| BS1 Surface 1 | | 20.000 | 20 × 20 | Silica | 20.000 |
| BS1 Surface 2 | | 2.000 | 20 × 20 | Quartz | 2.000 |
| WP Surface 1 | | | | | |
| WP Surface 2 | | 3.000 | 20 × 20 | Air | 3.000 |
| A Surface 1 | | 0.900 | 25 × 35 | Silica | 1.000 |
| A Surface 2 | | 3.000 | 25 × 35 | Air | 3.000 |
| BS2 Surface 1 | | 20.000 | 20 × 20 | Silica | 20.000 |
| BS2 Surface 2 | | 5.800 | 20 × 20 | Air | 2.021 |
| L1 Surface 1 | −22.56282 | 5.000 | 12.5 | Silica | 11.554 |
| L1 Surface 2 | 44.6786 | 8.300 | 15.5 | Air | 3.214 |
| L2 Surface 1 | −87.6808 | 10.000 | 20.0 | Silica | 4.000 |
| L2 Surface 2 | −35.9791 | 1.000 | 23.0 | Air | 12.161 |
| L3 Surface 1 | 134.112 | 16.000 | 27.5 | Silica | 1.856 |
| L3 Surface 2 | −39.12616 | 1.000 | 27.5 | Air | 17.905 |
| L4 Surface 1 | 70.2056 | 9.000 | 27.5 | Silica | 3.390 |
| L4 Surface 2 | | 1.000 | 25.0 | Air | 9.624 |
| L5 Surface 1 | 40.54856 | 9.000 | 25.0 | Silica | 7.965 |
| L5 Surface 2 | 30.1498 | 12.487 | 20.0 | Air | 12.487 |
| L6 Surface 1 | 30.1498 | 8.000 | 20.0 | Silica | 3.706 |
| L6 Surface 2 | 50.8254 | 4.500 | 18.0 | Air | 1.206 |
| W1 Surface 1 | | 3.000 | 20.0 | Silica | 3.000 |
| W1 Surface 2 | | 8.000 | 20.0 | Air | 8.000 |
| W2 Surface 1 | | 6.000 | | Silica | 6.000 |
| W2 Surface 2 | | 20.500 | | Air | 20.500 |
| S1 | | | 10 × 0.1 | Silicon | |

Figure 6C:
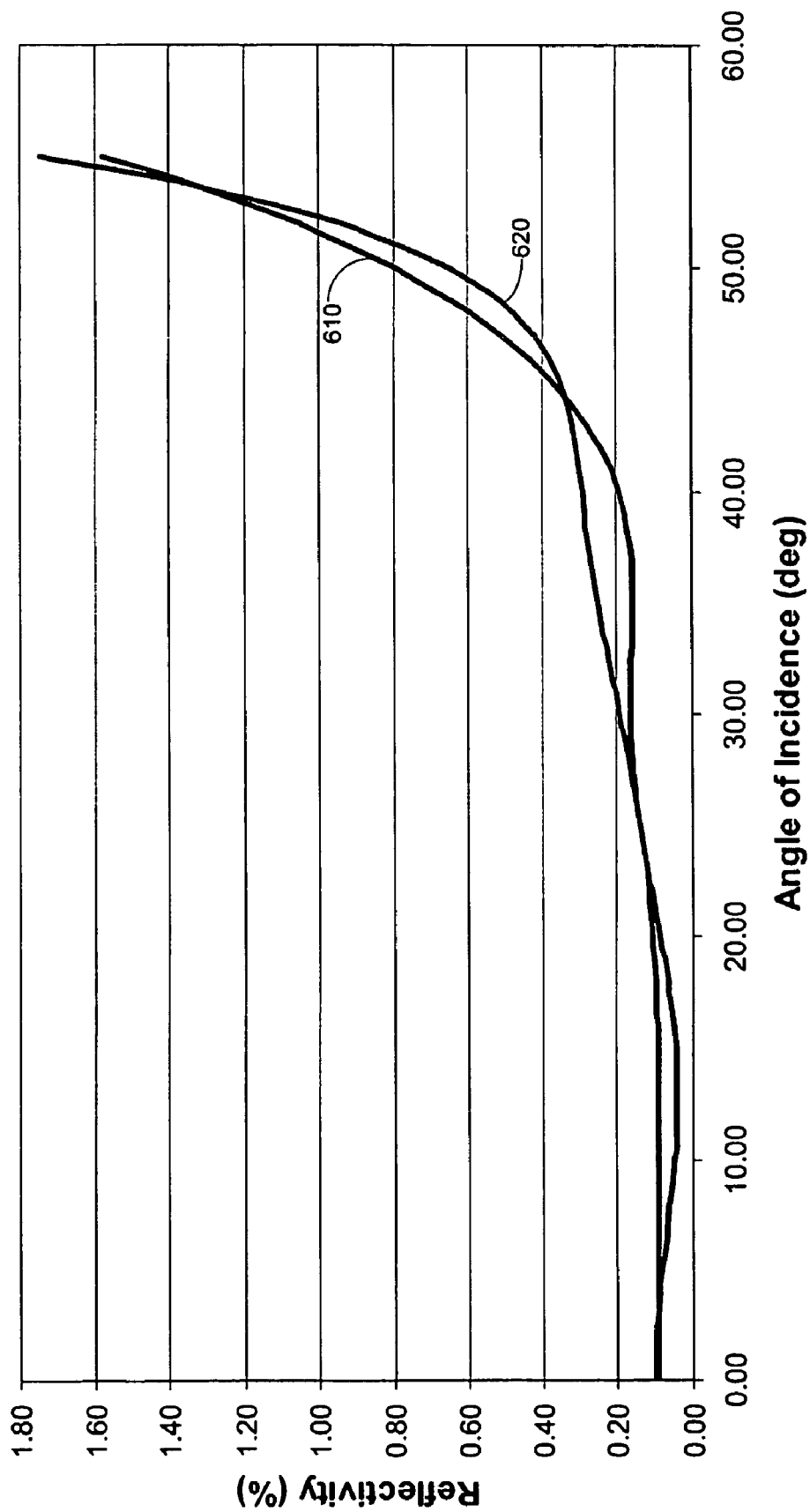
FIG. 6C shows the reflectivity of the nonreflective coating of FIG. 6A as a function of incidence angle for two different wavelengths.

In embodiments where thermal radiation is backpropagated through the system, it is advantageous to provide a coating on certain of the optical elements comprised by the illumination system 104 with a coating that is antireflective at both the wavelength of the light generated by the light sources 201 and 203 and of the thermal emission. For example, in embodiments where the light provided by the light sources 201 and 203 is at a wavelength of 808 nm and the thermal emission is at a wavelength around 950 nm, it may be advantageous to apply a coating that is antireflective from about 800 nm to about 1000 nm on all elements of the spherical lens array 272, the replaceable window 260, the chamber window for the coating detailed in FIG. 6A. These results show the substantially zero reflectance at wavelengths between about 800 nm and 1000 nm for light that is directly incident. The angular variation of the reflectivity is shown in FIG. 6C, with curve 610 showing the reflectivity at 810 nm and curve 620 showing the reflectivity at 975 nm. The relevance of these results in evaluating the effectiveness of the coating may be further understood with reference to Table II, which provides angle-of-incidence values that define the extreme angle of incidence for different components where the coating may be applied in the embodiment having the specific structure detailed in FIG. 5 and in Table I.

TABLE II

Angle of Incidence for Exemplary Embodiment

| Surface | SA Intersect (mm) | FA Intersect (mm) | $Z_{sag}$ | Angle of Incidence (deg) | | |
|---|---|---|---|---|---|---|
| | | | | Angle 1 | Angle 2 | Extreme |
| BS1 Surface 1 | 5.88 | 8.82 | | 7.26 | 4.99 | 7.26 |
| BS1 Surface 1 | 7.63 | 8.93 | | 4.99 | 7.26 | 7.26 |
| L1 Surface 1 | 7.93 | 8.95 | −3.43 | 27.29 | 18.39 | 27.29 |
| L1 Surface 2 | 10.24 | 10.51 | 2.48 | 33.35 | 53.03 | 53.03 |
| L2 Surface 1 | 12.40 | 12.21 | −1.74 | 22.62 | 15.35 | 22.62 |
| L2 Surface 2 | 14.56 | 13.98 | −6.19 | 7.77 | 11.33 | 11.33 |
| L3 Surface 1 | 17.84 | 16.37 | 2.20 | 33.74 | 22.47 | 33.74 |
| L3 Surface 2 | 18.66 | 16.93 | −9.19 | 28.12 | 43.22 | 43.22 |
| L4 Surface 1 | 18.50 | 15.94 | 4.38 | 17.51 | 11.95 | 17.51 |
| L4 Surface 2 | 18.06 | 15.39 | | 8.70 | 12.70 | 12.70 |
| L5 Surface 1 | 17.03 | 14.04 | 6.53 | 20.76 | 14.12 | 20.76 |
| L5 Surface 2 | 14.8 | 11.79 | 6.68 | 20.05 | 29.88 | 29.88 |
| L6 Surface 1 | 13.79 | 10.17 | 5.35 | 25.84 | 17.45 | 25.84 |
| L6 Surface 2 | 12.65 | 9.04 | 2.44 | 2.76 | 4.01 | 4.01 |
| W1 Surface 1 | 12.22 | 8.55 | | 17.53 | 11.96 | 17.53 |
| W1 Surface 2 | 11.80 | 8.07 | | 11.96 | 17.53 | 17.53 |
| W2 Surface 1 | 10.13 | 6.17 | | 17.53 | 11.96 | 17.53 |
| W2 Surface 2 | 9.30 | 5.22 | | 11.96 | 17.53 | 17.53 |

Having described several embodiments, it will be recognized by those of skill in the art that further modifications, alternative constructions, and equivalents may be used without departing from the spirit of the invention. Accordingly, the above description should not be taken as limiting the scope of the invention, which is defined in the following claims.

What is claimed is:

1. An illumination system for illuminating a surface, the illumination system comprising:
    a light source;
    an optical train disposed along an optical path between the light source and the surface, the optical train having optical elements configured to focus light from the light source into a defined geometrical pattern on the surface; and
    a wavelength beam splitter disposed in the optical path, wherein:
        the wavelength beam splitter is adapted to transmit light of a first wavelength and to redirect light of a second wavelength;
        one of the first and second wavelengths is comprised by the light from the light source; and
        the other of the first and second wavelengths is an emission wavelength generated by thermal excitation of the surface by the focused geometrical pattern and is not comprised by the light from the light source.

2. The illumination system recited in claim 1 further comprising an imaging subsystem disposed to focus light of the second wavelength redirected by the wavelength beam splitter onto a second surface, whereby the illumination system is a combined illumination and imaging system.

3. The illumination system recited in claim 1 wherein the light source comprises a monochromatic or quasimonochromatic light source.

4. The illumination system recited in claim 3 wherein the light source comprises a plurality of laser diodes that emit light at the first wavelength.

5. The illumination system recited in claim 3 wherein the first wavelength is approximately 808 nm and the second wavelength is greater than 850 nm.

6. The illumination system recited in claim 5 wherein at least some of the optical elements include an antireflective coating that is antireflective at the first wavelength and at the second wavelength.

7. The illumination system recited in claim 6 wherein the antireflective coating comprises a plurality of layers of $Ta_2O_5$ interleaved with a plurality of layers of $SiO_2$.

8. The illumination system recited in claim 1 wherein:
    the light source comprises a plurality of light sources; and
    the optical train comprises a spatial interleaver disposed to interleave light generated by a first set of the plurality of light sources with light generated by a second set of the plurality of light sources different from the first set.

9. The illumination system recited in claim 1 further comprising an isolation beamsplitter and a polarization-rotation element disposed in the optical path, wherein:
    the isolation beamsplitter is adapted to transmit light of a specified linear polarization and to redirect light not of the specified linear polarization from the optical path;
    the polarization-rotation element is adapted to change the specified linear polarization of light incident on the polarization-rotation element to a circular polarization; and
    the isolation beamsplitter and the polarization-rotation element are disposed to be encountered by light emanating from the light source and by light reflected from the surface.

10. The illumination system recited in claim 9 wherein the polarization-rotation element comprises a quarter waveplate.

11. The illumination system recited in claim 1 wherein the optical train comprises a cylinder array and a plurality of spherical lenses having optic axes along the optical path.

12. The illumination system recited in claim 11 wherein the optical train comprises a first coupling cylinder having an optic axis along the optical path.

13. The illumination system recited in claim 12 wherein the optical train further comprises a second coupling cylinder having an optic axis along the optical path and spaced apart from the first coupling cylinder.

14. A method of illuminating a surface, the method comprising:

generating first light comprising a first wavelength with a light source;

focusing the first light with an optical train disposed along an optical path between the light source and the surface into a defined geometrical pattern on the surface;

receiving second light comprising a second wavelength along the optical path, wherein:
  the second light is generated by thermal emission from the surface in response to focusing the first light on the surface; and
  the second wavelength is not comprised by the light generated with the light source; and redirecting the second light from the optical path.

15. The method recited in claim 14 further comprising focusing the redirected second light onto an imaging surface to generate an image of the surface.

16. The method recited in claim 14 wherein the first light is monochromatic or quasimonochromatic.

17. The method recited in claim 16 wherein the first wavelength is approximately 808 nm and the second wavelength is greater than 850 nm.

18. The method recited in claim 14 wherein generating the first light comprises:
  generating a first set of rays of the first light with a first set of a plurality of light sources;
  generating a second set of rays of the first light with a second set of the plurality of light sources; and
  interleaving the first set of rays with the second set of rays.

19. The method recited in claim 14 further comprising:
  receiving third light along a reverse direction of the optical path, the third light corresponding to the first light reflected from the surface; and
  redirecting the third light from the optical path.

20. The method recited in claim 19 wherein focusing the first light with the optical train comprises:
  transmitting light of a specified linear polarization along the optical path and redirecting light not of the specified linear polarization from the optical path;
  changing the specified linear polarization of the transmitted light to a circular polarization before it encounters the surface.

21. The method recited in claim 20 wherein:
  the third light has the circular polarization of the first light; and
  redirecting the third light from the optical path comprises:
    changing the circular polarization of the third light to a linear polarization different from the specified linear polarization; and
    redirecting light not of the specified linear polarization from the optical path.

22. The method recited in claim 14 wherein focusing the first light with the optical train comprises focusing the first light in a slow-axis direction without focusing the first light in a fast-axis direction.

23. An apparatus for thermally processing a substrate, the apparatus comprising:
  a stage disposed to support the substrate;
  a combined illumination and imaging system, wherein:
    the combined illumination and imaging system is adapted to illuminate the substrate with a line of electromagnetic radiation extending partially across a surface of the substrate; and
    the combined illumination and imaging system is adapted to provide an image of a portion of the substrate from an emission from the portion of the substrate generated by thermal excitation of the portion of the surface by the line of electromagnetic radiation; and
  a translation mechanism adapted to translate the stage and the line of electromagnetic radiation relative to each other.

24. The apparatus recited in claim 23 wherein the combined illumination and imaging system comprises:
  a light source;
  an optical train disposed along an optical path between the light source and the substrate, the optical train having optical elements configured to focus light from the light source into the line of electromagnetic radiation; and
  a wavelength beam splitter disposed in the optical path; and
  an imaging surface;
  wherein:
    the wavelength beam splitter is adapted to transmit light of a first wavelength and to redirect light of a second wavelength;
    one of the first and second wavelengths is comprised by the light from the light source;
    the other of the first and second wavelengths is an emission wavelength comprised by the emission from the portion of the substrate and is not comprised by the light from the light source; and
    light of the other of the first and second wavelengths is directed to the imaging surface.

25. The apparatus recited in claim 24 wherein the optical train includes an isolation structure configured to prevent light reflected from the substrate from encountering the light source.

26. The apparatus recited in claim 24 wherein the optical train is configured to focus light in a slow-axis direction without focusing the light in a fast-axis direction.

* * * * *